United States Patent [19]
McIntosh

[11] 3,731,672

[45] May 8, 1973

[54] HEART MONITORING APPARATUS FOR A MOTOR VEHICLE

[75] Inventor: Duane E. McIntosh, Palmyra, Wis.

[73] Assignee: General Motors Corporation, Detroit, Mich.

[22] Filed: Oct. 4, 1971

[21] Appl. No.: 185,942

[52] U.S. Cl.......128/2.06 A, 128/2.06 E, 128/DIG. 4
[51] Int. Cl..............................................A61b 5/04
[58] Field of Search ....................128/2.06 A, 2.06 E, 128/2.06 F, 2.06 R, 2.1 E, DIG. 4; 340/279

[56] References Cited

UNITED STATES PATENTS

| | | | |
|---|---|---|---|
| 2,816,282 | 12/1957 | Sewell | 340/279 |
| 3,049,090 | 8/1962 | Bergen | 340/279 |
| 3,144,019 | 8/1964 | Haber | 128/2.06 A |
| 3,267,934 | 8/1966 | Thornton | 128/2.06 A |
| 3,460,527 | 8/1969 | Karsh | 128/2.06 A |
| 3,524,442 | 8/1970 | Horth | 128/2.06 A |
| 3,612,041 | 10/1971 | Ragsdale | 128/2.06 A |

Primary Examiner—William E. Kamm
Attorney—Eugene W. Christen et al.

[57] ABSTRACT

The EKG signal of the vehicle operator is sensed through electrodes mounted in the steering wheel and conditioned by amplifying and band pass filtering means to produce a signal which is substantially the QRS complex of the EKG signal. The width of the QRS complex is continually compared with the nominal width for the vehicle operator and an indication of whether the width is narrower or wider is provided to the operator.

3 Claims, 5 Drawing Figures

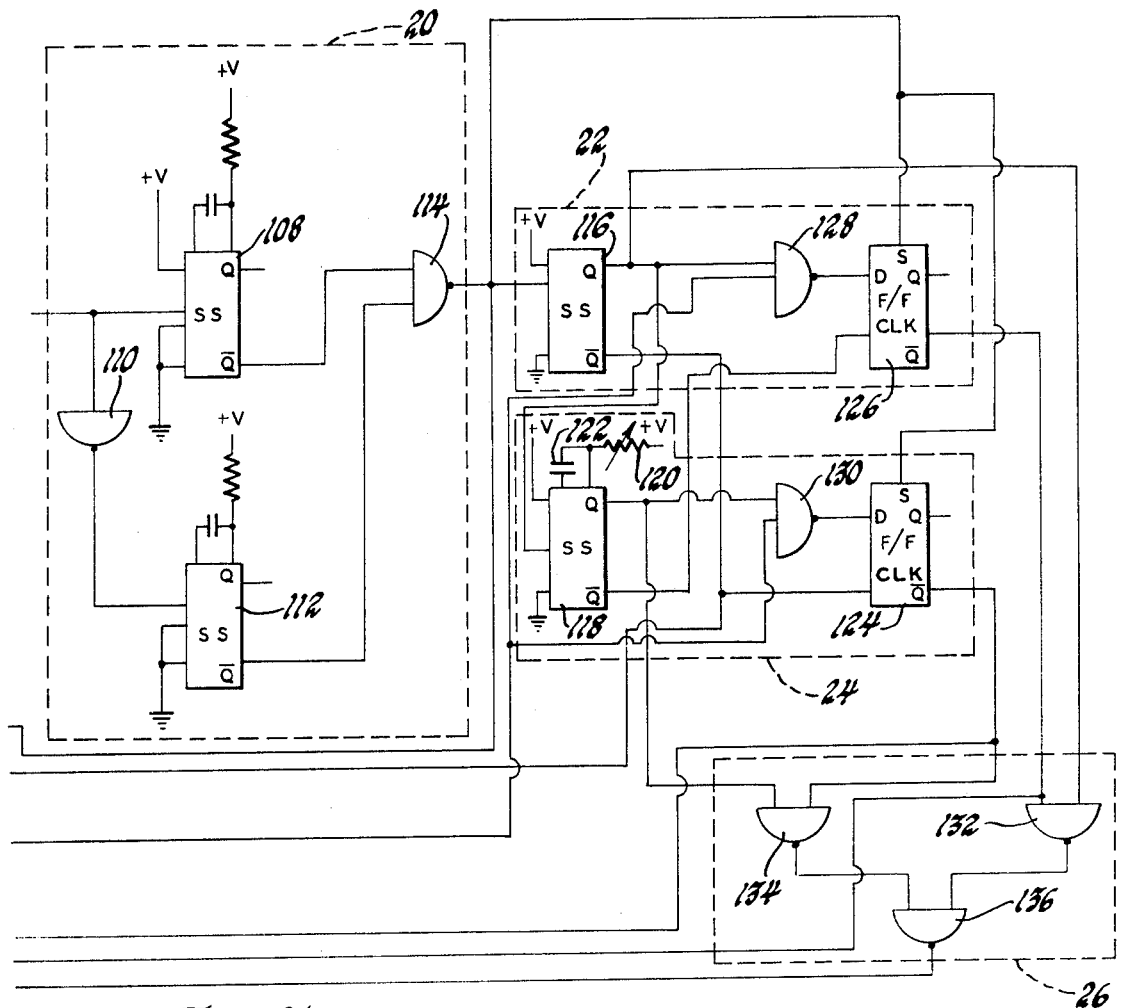
Fig. 2b
| TRUTH TABLE | | |
|---|---|---|
| X | Y | Z |
| 1 | 1 | 0 |
| 0 | 1 | 1 |
| 1 | 0 | 1 |
| 0 | 0 | 1 |
Fig. 3
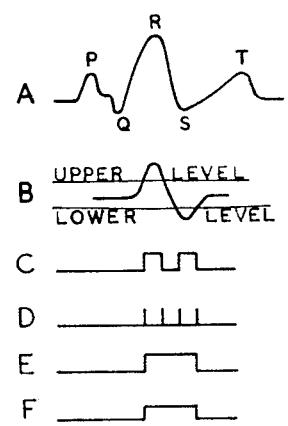
Fig. 4
INVENTOR.
Duane E. McIntosh
BY
Albert F. Duke
ATTORNEY

HEART MONITORING APPARATUS FOR A MOTOR VEHICLE

This invention relates to a cardiac monitor and more particularly to apparatus for continuously monitoring the electrocardiac signal of the operator of a motor vehicle.

Coronary artery disease is a leading cause of death in the adult population. This disease starts early in childhood and is found in a significant percentage of American males between ages 18 and 21. The disease progresses in asymptomatic form and may culminate in angina pectoris, i.e. a heart attach, or sudden death from a cardiac arrythmia. The latter is believed responsible for a significant number of automobile accidents. Early detection of the disease could result in more successful treatment, however, this is seldom accomplished because early electrocardiac abnormalities may occur only during periods of stress and then only transiently. Most often the abnormality is only discovered after damage has already occurred.

Driving an automobile is a daily occurrence with a significant percentage of the population. For many American working males morning and evening motoring to and from work has become a daily occurrence. Accordingly, the automobile provides a readily available environment for dynamic testing of the physiological well being of many individuals.

With the foregoing in mind, it is an object of the present invention to provide apparatus particularly suitable for continuously monitoring the electrocardiac signal of a motor vehicle operator during vehicle operation.

It is another object of the present invention to provide apparatus for detecting and indicating any significant change in the electrocardiac signal of an individual.

It is another object of the present invention to provide a cardiac monitor for a motor vehicle which includes display circuitry which is biased in favor of indicating normal electrocardiac activity of the vehicle operator to prevent erroneous abnormal indications which might result from the dynamic conditions under which the monitoring is performed.

It is another object of the present invention to provide a cardiac monitor for a motor vehicle operator which is highly insusceptible to extraneous electrical signals encountered during normal vehicle operation.

In accordance with the present invention the electrical activity of the heart present at the hands of the vehicle operator is picked up by electrodes located in the steering wheel of the vehicle. Signal conditioning means amplify, filter and differentiate the EKG signal. This conditioned signal is rectified by a saturation driven full wave rectifier and fed to pulse generating means which produces a pulse train having a pulse corresponding to each edge of the rectified signal. Circuitry responsive to the generated pulses performs a reasonableness test based on the number of pulses generated, to further limit the possibility of processing and indicating spurious data. Each of the pulses generated are applied to the input of a fixed pulse stretcher which provides an output pulse of time duration proportional to time duration between the rising edge of the first generated pulse and the falling edge of the last generated pulse which in turn is related to the width of a scaled version of the QRS complex of the EKG signal. The output of the pulse stretcher is compared with a pulse output which is proportional to the nominal width of the QRS complex for the vehicle operator and an error signal is generated. A proportional pulse stretcher is provided to multiply the error signal which is used to drive one of two thermal integrators, depending upon whether the error signal represents a wider or narrower than nominal QRS width for the operator. The thermal integrators provide long term integration of the error signal generated. The difference in output of the thermal integrators is used to drive a differential power ratiometer to provide an indication of the amount and direction of the deviation in QRS complex width.

A more complex understanding of the present invention may be had from the following detailed description which should be read in conjunction with the drawings in which:

FIGS. 2a and 2b are a schematic diagram of the apparatus of the present invention;

FIG. 3 shows a truth table for the logic employed in the apparatus of the present invention;

FIG. 4 shows waveforms at various junctions in the apparatus and provides an aid in understanding the invention.

Figure 1:
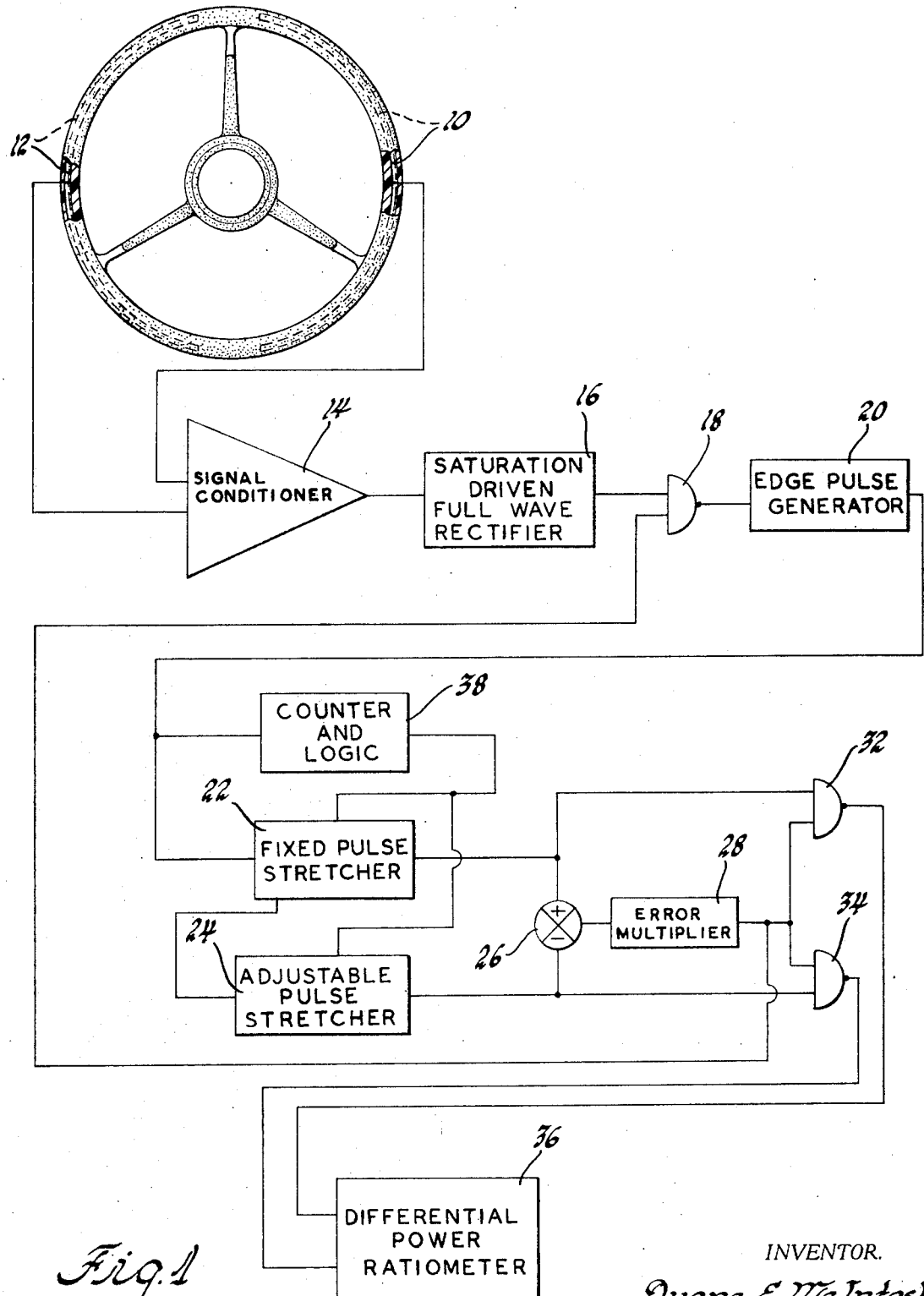
FIG. 1 is a functional block diagram of the apparatus of the present invention.

Referring now to the drawings and initially to FIG. 1, the cardiac monitor of the present invention comprises electrodes 10 and 12 of generally semicircular shape which are imbedded in the motor vehicle steering wheel and pick up the electrocardiac signal present between the hands of the vehicle operator during operation of the vehicle. The steering wheel is preferably made of a relatively good conductor such as for example, a silver-silver chloride material. While each electrode 10 and 12 is shown as covering substantially one-half the steering wheel circumference, other arrangements are permissible. For example, the electrodes may cover only a small area in locations most often gripped by the operator during operation of the vehicle.

The electrodes 10 and 12 are connected to signal conditioning means 14 which amplify the difference in potential existing between the hands of the operator; provide a substantial attenuation of signals of a frequency on either side of a 30 Hz. to 100 Hz. band. The resulting signal consists primarily of the ventricular depolarization waveforms (QRS complex) the character of which is somewhat altered by the signal conditioner 14 but which is of a width proportional to the actual QRS complex. The signal is further processed by saturation driven full wave rectifier means generally designated 16 which includes upper and lower level detectors and gating means for producing a pulsating output. The pulsating output passes through a gate NAND 18 to an edge pulse generator 20 which generates pulses on the rising and falling edges of the rectified signal.

Each pulse from 4 the generator 20 triggers a fixed pulse stretcher 22 which is used to represent the width of the QRS complex. While the width of this pulse is not a clinical representation of the true width of the QRS complex, it is as previously mentioned, proportional to the true width of the QRS complex. The first pulse from the generator 20 also triggers an adjustable pulse stretcher 24 which produces an output pulse of adjustable duration proportional to the nominal width of the QRS complex for the particular operator of the vehicle.

The outputs of the pulse stretchers 22 and 24 are fed to a comparator 26 which provides an output equal to the difference between the input pulse widths. The output of the comparator 26 is applied to a proportional pulse stretcher or error multiplier 28 which multiplies the error signal and also disables gate 18 to prevent any extraneous signals from triggering the generator 20. Depending on whether the QRS interval measured is greater than or less than the nominal period established by the stretcher 24, one of a pair of NAND gates 32 or 34 will be enabled to pass the multiplied error signal to a differential power ratiometer 36 which integrates the error signal to a differential power ratiometer 36 which integrates the error signal over a large time interval and provides an indication of any long term variation of the detected EKG signal from the nominal EKG signal of the vehicle operator.

The output of the generator 20 is also fed through counter and logic circuitry 38 which determines, based on the number of pulses counted, whether the pulses being generated are a result of the EKG signal or from some extraneous source. The counter and logic 38 provide an enable/disable signal to the pulse stretchers 22 and 24 so that a comparison is made only when the data is reasonably related to the QRS complex.

Figure 2A:
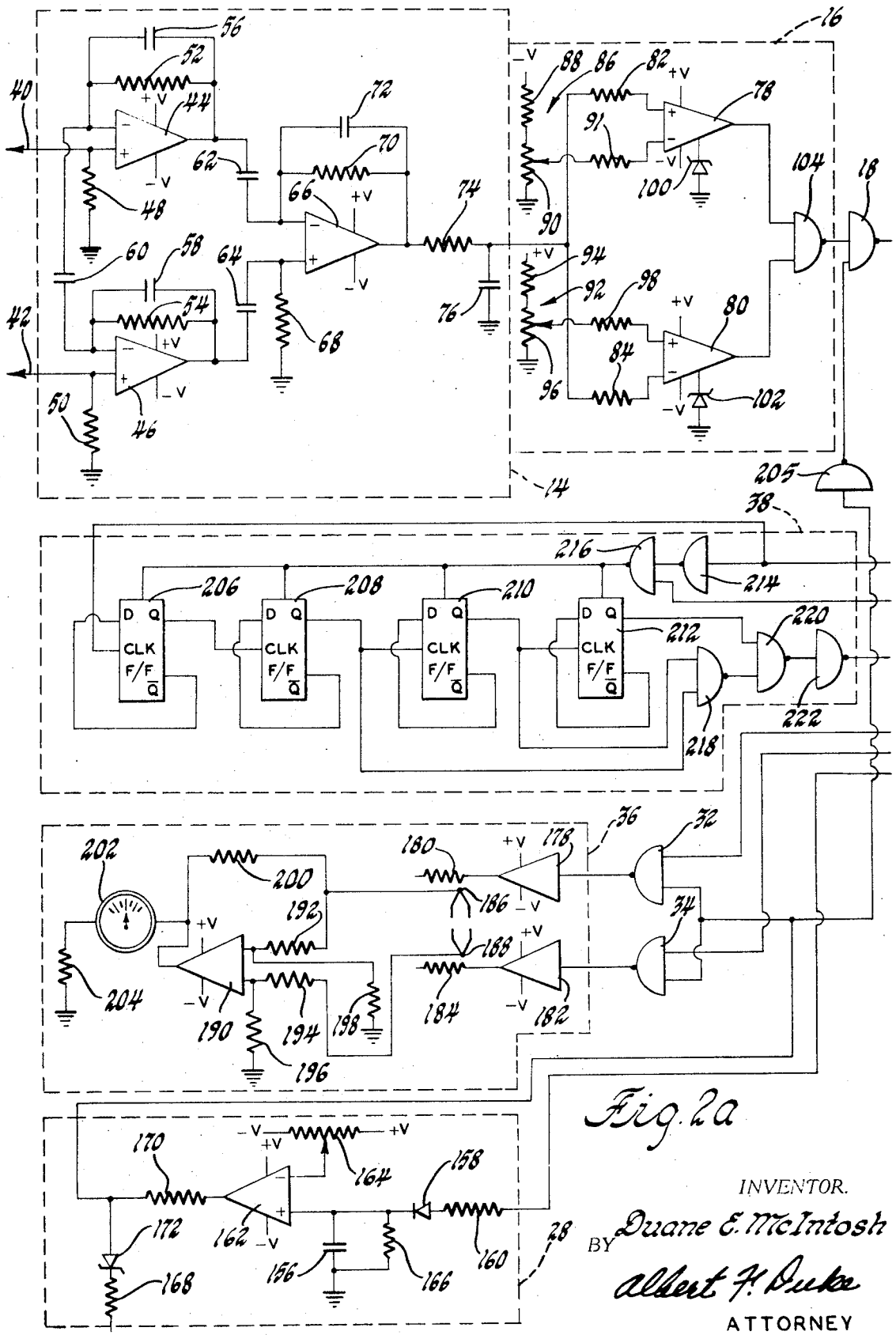

Referring now to FIG. 2a, input leads 40 and 42 connect the signal conditioning means 14 to the electrodes 10 and 12. The signal conditioning means 14 include a high input impedance AC coupled differential amplifier comprising a pair of operational amplifiers 44 and 46 having non-inverting and inverting inputs designated + and − respectively. The electrodes 10 and 12 are connected respectively to the non-inverting inputs of the amplifiers 44 and 46. The amplifiers 44 and 46 have their non-inverting inputs grounded through resistors 48 and 50 respectively and have their output terminals connected with the inverting input terminals through resistors 52 and 54 respectively. Capacitors 56 and 58 are connected from the output to the inverting input of the amplifiers 44 and 46 respectively to heavily attenuate extraneous data of a frequency over 100 cycles. The rest of the data appears at the inverting inputs of the amplifiers 44 and 46 and at approximately a gain of 1. A capacitor 60 connects the inverting inputs of the amplifiers 44 and 46 together and heavily attenuates the very low frequency inputs received at the non-inverting inputs of the amplifiers 44 and 46. The non-inverted data appearing at the output of the amplifiers 44 and 46 is fed back to the inverting input of the other amplifier through the capacitor 60 so that in effect, the difference in potential appearing between the hands of the operator is applied as the two inputs to both amplifiers 44 and 46 with this difference being amplified at the output of each amplifier 44 and 46 which is then fed back to the other amplifier permitting a gain of higher than 1 to be achieved on the high frequency data from the heart pulse while still maintaining a high input impedance. The outputs of the amplifiers 44 and 46 are AC coupled through capacitors 62 and 64 which removes minor DC offsets in the amplifiers 44 and 46 and are applied to a summing amplifier 66 having its non-inverting input grounded through a resistor 68 and its output connected to its inverting input through a resistor 70. The output of amplifier 66 is connected to the non-inverting input by a capacitor 72 and is connected to ground through a resistor 74 and a capacitor 76 to further attenuate frequencies below 30 Hz. and above 100 Hz. The EKG waveform A shown in FIG. 4 appears at the output of the signal conditioner 14 as shown in waveform B in FIG. 4 and is applied to the full wave rectifier 16.

The full wave rectifier 16 comprises a pair of operational amplifiers 78 and 80 which serve as level detectors. The output of amplifier 66 is applied to the non-inverting input of the amplifier 78 and the inverting input of the amplifier 80 through resistors 82 and 84 respectively. The level at which the amplifiers 78 and 80 switch states is determined by the voltage appearing at the inverting input of the amplifier 78 and at the non-inverting input of the amplifier 80. The voltage at the inverting input of the amplifier 78 is established by a voltage divider network generally designated 86 comprising resistors 88, 90 and 91. The voltage established at the non-inverting input of the amplifier 80 is determined by a voltage divider network 92 comprising resistors 94, 96 and 98. Zener diodes 100 and 102 regulate the voltage at the output of the amplifier 78 and 80 respectively to a magnitude consistent with the logic circuitry employed. The output of amplifiers 78 and 80 is connected with a NAND gate 104. As shown in the truth table in FIG. 3, the output of the NAND gate 104 is a logic "1" whenever either of the inputs to the gate 104 are a logic "0" and is a logic "0" only when both inputs to the gate 104 are a logic "1."

The positive voltage level established at the non-inverting input of the amplifier 80 maintains the output of the amplifier 80 at a logic "1" except for that interval of time when the input signal applied to the inverting input is above the level established at the non-inverting input at which time the output of the amplifier 80 switches to a logic "0." Similarly, the output of the amplifier 78 is a logic "1" due to the inversion of the negative voltage applied at the inverting input and remains a logic "1" except for the interval of time that the input signal is below the negative voltage established at the inverting input. Thus the inputs to gate 104 are normally logic "1's" providing a logic "0" output. Whenever either of the outputs of the amplifier 78 or 80 drop to a logic "0" the output of the gate 104 switches to a logic "1." Consequently, the signal applied to the input of the amplifiers 78 and 80 appears at the output of the gate 104 as the pulsating waveform C shown in FIG. 4 containing a pulse for each excursion of the input signal above and below each of the voltage levels established by the network 86 and 92. The output of the gate 104 is applied as one input to the NAND gate 18, the other input of which is a logic "1" for reasons which will be explained hereinafter. Accordingly, the output of the gate 18 is a logic "0," whenever the output of the gate 104 is a logic "1"; and switches to a logic "1" whenever the output of the gate 104 switches to a logic "0."½

The output of the gate 18 is applied to the input of a single shot or monostable multivibrator 108 of pulse generator 20 (FIG. 2b) and is inverted by a NAND gate 110 and applied to the input of a second single shot or monostable multivibrator 112. The $\overline{Q}$ terminal of the multivibrator 108 switches from a logic "1" to a logic "0" on the rising edge of the output of the gate 18. The $\overline{Q}$ terminal of the multivibrator 112 switches from a logic "1" to a logic "0" on the rising edge of the output of the gate 110 which corresponds to the falling edge of the output of the gate 18. The $\overline{Q}$ terminals of the multivibrators 108, 112 are connected as inputs to a NAND gate 114 which provides at its output the trigger pulse train shown in FIG. 4 (waveform D) corresponding to the rising and falling edges of each pulse in the pulse train output of the gate 18.

The gate 114 is connected to the input of a single shot or monostable multivibrator 116 of pulse stretcher 22 which has its Q output terminal connected to the input of a single shot or monostable multivibrator 118 of adjustable pulse stretcher 24. During their stable state, the respective Q and $\overline{Q}$ outputs of the multivibrator 116 and 118 are logic "0" and logic "1." The first pulse from the pulse generator 20 switches the Q output of multivibrator 116 to a logic "1" which switches the Q output of the multivibrator 118 to a logic "1." The unstable state of the multivibrator 116 is of sufficient duration so that the multivibrator 116 will not return to its stable state during the time interval between pulses from the pulse generator 20. Thus, a fixed time interval after the final pulse from the pulse generator 20 the multivibrator 116 returns to its stable state as shown in the waveform E of FIG. 4. The multivibrator 118 has an unstable state which is adjustable by varying the resistance of a series RC network comprising the resistor 120 and the capacitor 122 to produce the waveform F of FIG. 4. By varying the resistor 120 the cardiac monitor may be programmed for the particular vehicle driver as will be explained more fully hereinafter.

The $\overline{Q}$ output terminal of the multivibrator 116 is applied to the clock input of a delay or D type flip-flop 124 which transfers the data appearing at its D terminal to its Q output terminal on the rising edge of a clock pulse. The $\overline{Q}$ terminal of the multivibrator 118 is connected with the clock terminal of a D type flip-flop 126. The Q terminal of the multivibrator 116 is applied to the D terminal of the flip-flop 126 through a NAND gate 128 while the Q terminal of the multivibrator 118 is applied to the D terminal of the flip-flop 124 through a NAND gate 130. The other inputs to the gates 128 and 130 are received from the counter and logic circuitry 30 and are assumed to be a logic "1" at this point in the discussion. The set terminals S of the flip-flops 124 and 126 are connected with the output of the pulse generator 20 so that the output at the $\overline{Q}$ terminals of the flip-flops 124 and 126 are set to a logic "0" by the pulses from the pulse generator 20. If the Q output terminal of the multivibrator 116 is a logic "1, " i.e. the multivibrator 116 is in its unstable state, logic "1's" are applied to both inputs of the gate 128 and a logic "0" appears at the D terminal of the flip-flop 126. When the multivibrator 116 reverts to its stable state, a logic "0" appears at one input of the gate 128 producing a logic "1" on the D terminal of flip-flop 126. Similarly, while the multivibrator 118 is in its unstable state, logic "1's" appear at the inputs to gate 130 producing a logic "0" at the D terminal of the flip-flop 124. When the multivibrator 118 reverts to its stable state a logic "0" appears at one input of the gate 130 producing a logic "1" at the D terminal of flip-flop 124.

If the multivibrator 116 reverts to its stable state while the multivibrator 118 is still running, indicative of the fact that the data detected was of shorter duration than nominal, a logic "0" is clocked into the Q terminal of flip-flop 124 and consequently a logic "1" is produced at the $\overline{Q}$ terminal of the flip-flop 124. Then when the multivibrator 118 does revert to its stable state, a logic "1" is clocked into the Q terminal of flip-flop 126 maintaining a logic "0" on the $\overline{Q}$ terminal of the flip-flop 126. On the other hand, if the multivibrator 118 reverts to its stable state, while the multivibrator 116 is still running, indicative of the fact that the data detected was of longer duration than nominal, a logic "1" is clocked into the $\overline{Q}$ terminal of the flip-flop 126. Then when the multivibrator 116 does revert to its stable state a "1" is clocked into the Q terminal of the flip-flop 124 maintaining a logic "0" at the $\overline{Q}$ terminal of the flip-flop 124. Thus the outputs at the $\overline{Q}$ terminals of the flip-flops 124 and 126 provide an indication of whether the data detected was of shorter or longer than nominal duration.

The comparator 26 comprises NAND gates 132, 134 and 136. The NAND gate 132 has inputs connected to the $\overline{Q}$ terminal of the flip-flop 126 and the Q terminal of the multivibrator 116. The gate 134 has its inputs connected to the $\overline{Q}$ terminal of the flip-flop 124 and the Q terminal of the multivibrator 118. The gate 136 has its inputs connected to the outputs of the gates 132 and 134. The first pulse from the pulse generator 20 sets the flip-flops 126 and 128 placing a logic "0" at the $\overline{Q}$ terminals thereof and switches the Q terminals of the multivibrators 116 and 118 to a logic "1." Thus the outputs of the gates 132 and 134 are initially a logic "1" and the output of the gate 136 is a logic "0." The output of the gate 136 switches to a logic "1" if the $\overline{Q}$ terminals of either of the flip-flops 124 or 126 switches to a logic "1" which occurs when one of the multivibrators 116 and 118 reverts to its stable state. The output of the gate 136 will revert to a logic "0" when the other of the multivibrators 116 and 118 subsequently reverts to its stable state. For example, if the width of the data detected is less than nominal the multivibrator 116 reverts to its stable state while the multivibrator 118 is still running placing a logic "1" at the $\overline{Q}$ terminal of flip-flop 124 which switches the gate 134 to a logic "0" causing the gate 136 to produce a logic the 1." When the multivibrator 118 reverts to its stable state the logic "0" input to the gate 134 switches its output to a logic "1" causing the output of the gate 136 to switch to a logic "0." Similarly, if the width of the data detected is longer than nominal, the $\overline{Q}$ terminal of the flip-flop 126 switches to a logic "1" when the multivibrator 118 reverts to its stable state providing a logic "0" input to the gate 136 from the gate 132. This produces a logic "1" at the output of the gate 136. When the multivibrator 116 reverts to its stable state the logic "0" input to the gate 132 switches its output to a logic "1" causing the output of the gate 136 to switch to a logic "0." Accordingly, the time duration of the logic "1" output of the gate 136 is proportional to the difference in expiration time of the multivibrators 116 and 118 and therefore proportional to the difference between the nominal and the detected data interval.

The error multiplier 28 is a pulse stretcher which includes a capacitor 156 which is connected to the output of the gate 136 through a diode 158 and a resistor 160. The capacitor 156 is connected to the non-inverting input of a differential amplifier 162 which has its inverting input connected to a voltage divider 164 which establishes the threshold level of the amplifier 162. As the capacitor 156 charges above the threshold level of the amplifier 162, the output of the amplifier 162 switches from a logic "0" to a logic "1." When the output of the gate 136 switches to a logic "0" the capacitor 156 discharges through a resistor 166. The discharge time for the capacitor 156 is substantially greater than the charge time so that the output of the amplifier 162 remains at a logic level "1" for a much longer period of time than does the output of the gate 136. Resistors 168 and 170 and zener diode 172 clamp the output voltage of amplifier 162 to a value compatible with the logic employed.

The output of the amplifier 162 is one input to NAND gates 32 and 34. The other input to the gate 32 is from the $\overline{Q}$ terminal of flip-flop 124, while the other input to the gate 34 is from the $\overline{Q}$ terminal of flip-flop 126. Therefore, when the flip-flop 124 and 126 are set by the pulse generator 20 both inputs to the gates 32 and 34 are logic "0's" producing logic "1" outputs. If the width of the data detected is greater than nominal the gate 34 receives a logic "1" input from the $\overline{Q}$ terminal of the flip-flop 126 and a logic "1" input from the amplifier 162 while if the width of the data detected is less than nominal, the gate 32 receives a logic "1" input from the $\overline{Q}$ terminal of the flip-flop 124 and a logic "1" input from the amplifier 162. Thus, the width of the error pulse output of the comparator 26, after stretching by the error multiplier 28 if applied to one of two channels depending upon whether the error results from a wider or narrower than nominal QRS complex.

The differential power ratiometer 36 comprises a switching amplifier 178 which energizes a heater 180 whenever the output of the gate 32 switches from a logic "1" to a logic "0." A switching amplifier 182 energizes a heater 184 whenever the output of the gate 34 switches from a logic "1" to a logic "0." The heaters 180 and 184 drive thermocouples 186 and 188 respectively, which are connected with the inverting and non-inverting inputs of a differential amplifier 190 through resistors 192 and 194 respectively. The inverting and non-inverting inputs of the amplifier 190 are connected to ground through resistors 196 and 198 respectively and a resistor 200 connects the output of the amplifier 190 to the inverting input. The output of the amplifier 190 drives a meter 202 which is grounded through a resistor 204. The meter 202 provides a mid-range reading when the inputs to the differential amplifier are the same and provides a reading on either side of mid-range indicative of a QRS complex of width greater than or less than the nominal width established by the multivibrator 118. The output of the amplifier 162 is also fed through an inverter comprising NAND gate 205 to inhibit the gate 18 while the data detected is being processed in the ratiometer 36.

The nominal time interval established by the multivibrator 118 is adjustable by varying the resistor 120. Accordingly, by adjusting the resistor 120 until a mid-range indication is obtained on the meter 202, the apparatus of the present invention may be set for the particular individual operating the vehicle and will thereafter provide an indication of any significant deviation in the QRS complex of the EKG signal of the individual.

The counter and logic circuitry 38 provides a means for determining whether the output of the pulse generator 20 is reasonably related to the EKG signal rather than some extraneous input and includes a counter comprising a plurality of D type flip-flops 206, 208, 210 and 212. The Q terminal of each flip-flop is connected with the clock terminal of the following flip-flop while the $\overline{Q}$ and D terminals of each flip-flop are connected together. The clock terminal of the flip-flop 206 is connected with the pulse generator 20 at the output of the gate 114. The output of the gate 114 is inverted by a NAND gate 214 and applied as one input to a NAND gate 216. The other input of the gate 216 is connected with the $\overline{Q}$ terminal of the multivibrator 116. The Q terminals of flip-flops 208 and 210 provide inputs to a NAND gate 218. The Q terminal of flip-flop 212 and the output of the gate 218 provide inputs to a NAND gate 220 the output of which is inverted by NAND gate 222 and applied as one input to the gates 128 and 130.

Prior to generation of a pulse from the generator 20 the $\overline{Q}$ terminal of the multivibrator 116 is at a logic "1" and the output of the gate 214 is a logic "1" providing a logic "0" at the output of gate 216. The logic "0" output of the gate 216 sets the flip-flops 206, 208, 210 and 212 placing a logic "1" at their respective Q terminals and a logic "0" at their respective $\overline{Q}$ and D terminals. This places logic "1" at the input to the gate 218 providing a logic "0" at its output. Thus a logic "0" and a logic "1" are applied to the inputs of gate 220 providing a logic "1" which is inverted by gates 222 to provide a logic "0" input to gates 128 and 130. The first output pulse from the generator 20 is applied to the clock input of the flip-flop 206 but has no effect since the flip-flop 206 is held in a set condition at the time of arrival of the pulse. The first output pulse also triggers the multivibrator 116 and in turn the multivibrator 118 providing a logic "0" at the $\overline{Q}$ terminal of multivibrator 116 which raises the output of the gate 216 to a logic "1" releasing the counter which is now free to count the succeeding pulses from the generator 20. On the third pulse from the generator 20 the Q terminal of the flip-flop 208 switches from a logic "1" to a logic "0" which places a logic "1" at the output of the gate 222 thus enabling the gates 128 and 130. The gates 128 and 130 will remain enabled until a logic "0" appears at the Q terminal of the flip-flop 212, which occurs on the 17th pulse from the generator 20.

It will be appreciated that the counter establishes a window which in the example given, wherein the counter comprises four flip-flops, permits the evaluation of only those electrical input signals which result in more than two and less than seventeen output pulses from the generator 20. A noise spike producing two pulses from the generator 20 would trigger the multivibrators 116 and 118 but would not affect the output at the gate 222 which would remain at a logic "0" maintaining a logic "1" at the output of gates 128 and 130. When the multivibrators 116 and 118 expire a logic "0" is maintained at the $\overline{Q}$ terminals of the flip-flops 124 and 126 which disables the gates 174 and 176 preventing energization of the heaters 180 and 184.

Similarly, if the vehicle is located in an area near a 60-cycle transformer for example, or if the operator taps his fingers on the steering wheel in a fashion that causes the generator 20 to produce 17 or more output pulses than the Q terminal of the flip-flop, 212 will switch to a logic "0" placing a logic "0" at the output of the gate 222 thereby preventing energization of the heaters 180 and 184 in the same manner as described above. It will be understood that the width of the window established by the counter may be varied by changing the number of flip-flops.

While the invention has been described in connection with apparatus for monitoring the EKG signal it will be apparent to those skilled in the art that the technique employed of monitoring for change in the EKG signal is applicable to other complex waveforms related to the physiological condition of the individual.

I claim:

1. Apparatus for monitoring the physiological condition of an occupant of a motor vehicle during vehicle operation comprising;
   pickup means for sensing an electrical signal related to the physiological condition of the vehicle occupant,
   signal conditioning means connected with said pickup means,
   rectifier means connected with said signal conditioning means for developing an output pulse corresponding to each excursion of the conditioned signal above and below respective upper and lower-voltage levels,
   pulse generating means for generating a trigger pulse train corresponding to the leading and trailing edge of each output pulse,
   pulse stretcher means responsive to said trigger pulse train for developing a pulse of duration greater by a fixed time interval than the duration of said trigger pulse train,
   adjustable pulse stretcher means responsive to the first pulse in said trigger pulse train for developing a pulse of adjustable duration,
   comparator means responsive to the output of said fixed and adjustable pulse stretchers for developing an error pulse output of duration proportional to the difference in the duration of the output of said fixed and adjustable pulse stretcher means,
   means including ratiometer means responsive to said error signal for indicating the magnitude and polarity of said error signal,
   means for manually adjusting the output of said adjustable pulse stretcher to produce a null output from said ratiometer means whereby said ratiometer indicates any significant change in the width of the output signal of said signal conditioning means subsequent to adjustment of said adjustable pulse stretcher,
   means for counting the number of pulses in said trigger pulse train and for inhibiting the output of said fixed and adjustable pulse stretchers when the number of pulses in said pulse train are less than or greater than a predetermined number.

2. In a motor vehicle provided with a steering wheel, apparatus for monitoring the electrocardiac signal of the operator of the vehicle and for indicating to said operator a change in said signal from the nominal signal of the operator, said apparatus comprising;
   a pair of electrodes mounted in said steering wheel for sensing the electrocardiac signal present between the hands of the operator,
   signal conditioning means comprising first and second amplifiers having their non-inverting inputs connected with respective ones of said electrodes, a capacitor interconnecting the inverting inputs of said first and second amplifiers, a resistance-capacitance network interconnecting the output of each of said first and second amplifiers to their respective inverting inputs, a third amplifier having its respective non-inverting and inverting inputs capacitively coupled to said first and second amplifiers, a third resistance capacitance network interconnecting the output and inverting input of said third amplifier,
   full-wave rectifier means comprising first and second level detecting means responsive to the output of said signal conditioning means for developing a pulse train containing a pulse for each excursion of the input signal above and below a positive and a negative voltage level,
   pulse generating means for developing a trigger pulse corresponding to each of the leading and trailing edges of said pulse train,
   pulse stretcher means comprising a single shot multivibrator triggerable to a semi-stable state in response to a trigger pulse from said pulse generator means and returning to its stable state a fixed interval of time thereafter, a second single shot multivibrator triggerable to its semi-stable state in response to the triggering of said first single shot multivibrator and returning to its stable state after an adjustable time interval,
   differential power ratiometer means comprising first and second channels,
   gating and storage means responsive to the state conditions of said first and second monostable multivibrators for developing an error signal for application to one or the other of said first and second channels depending upon which of said monostable multivibrators first returns to its stable state and proportional to the difference in the duration of the unstable state of said first and second monostable multivibrators,
   means for counting the number of trigger pulses from said pulse generator and for inhibiting said gating means when the number of trigger pulses are less than or greater than a predetermined number.

3. In a motor vehicle provided with a steering wheel, apparatus for monitoring for any change in the electrocardiac signal of the operator of the motor vehicle during vehicle operation comprising first and second electrodes mounted in said steering wheel for sensing the electrocardiac signal existing between the hands of the vehicle operator,
   signal conditioning means comprising amplifying and filtering means connected across said electrodes for developing a scaled version of the QRS complex of said electrocardiac signal,
   means including full wave rectifying means and pulse generating means for developing a group of trigger pulses over an interval of time related to the width of the QRS complex of said electrocardiac signal,
   pulse stretcher means responsive to said trigger pulses for developing a pulse of duration greater by a fixed time interval than the duration of said group of trigger pulses, adjustable pulse stretcher means responsive to the first pulse in said group of trigger pulses for developing a pulse of duration corresponding to the nominal width of the QRS complex of the electrocardiac signal of the vehicle operator, comparator means responsive to the output of said fixed and adjustable pulse stretchers for developing a pulse output of duration proportional to the difference in the duration of the QRS complex being monitored and the nominal QRS complex of the vehicle operator, error amplifying means connected with said comparator means, indicator means having first and second input channels and providing an indication of the average magnitude and direction of any deviation of the sensed QRS complex from the nominal QRS complex of the operator, first and second gate means when enabled applying said error signal to said first and second input channels respectively, means for enabling one or the other of said first and second gate means depending upon whether the output of said pulse stretcher means is less than or greater than the output of said adjustable pulse stretcher means, means for counting the number of trigger pulses in each group of trigger pulses for disabling said first and second gate means whenever the number of pulses counted as less than or greater than a predetermined number of pulses.

* * * * *